United States Patent

Standke et al.

Patent Number: 5,849,942
Date of Patent: Dec. 15, 1998

[54] FLUOROALKYL-FUNCTIONAL ORGANOPOLYSILOXANE-CONTAINING COMPOSITIONS

[75] Inventors: Burkhard Standke, Loerrach; Roland Edelmann, Wehr; Albert-Johannes Frings, Rheinfelden; Ralf Laven, Niederdossenbach; Michael Horn, Rheinfelden; Peter Jenkner, Rheinfelden; Helmut Mack, Rheinfelden; Jaroslaw Monkiewicz, Rheinfelden, all of Germany

[73] Assignee: Huels Aktiengesellschaft, Marl, Germany

[21] Appl. No.: 984,163

[22] Filed: Dec. 3, 1997

[30] Foreign Application Priority Data

Dec. 3, 1996 [DE] Germany ................ 196 49 955.0

[51] Int. Cl.$^6$ .................................................. C07F 7/08
[52] U.S. Cl. ........................................... 556/424; 556/425
[58] Field of Search ....................... 556/424, 425

[56] References Cited

U.S. PATENT DOCUMENTS 5,424,130   6/1995   Nakanishi .

*Primary Examiner*—Alan Siegel
*Attorney, Agent, or Firm*—Oblon, Spivak, McClelland, Maier & Neustadt, P.C.

[57] ABSTRACT

An aqueous alcoholic fluoroalkyl functional group containing organopolysiloxane- composition, comprising: organopolysiloxanes of formula I:

$$RO[Si(A)(CH_3)_z(OR)_{1-z}O]_a[Si(B)(R^2)_y(OR)_{1-y}O]_b$$
$$[Si(C)(CH_3)O]_c[Si(D)(OR)O]_dR \cdot (HX) \quad (I)$$

wherein A is an aminoalkyl radical derived from the compound of formula II:

$$H_2N(CH_2)_f(NH)_g(CH_2)_hSi(OR)_{3-z}(CH_3)_z \quad (II)$$

wherein $0 \leq f \leq 6$, $9=0$ if $f=0$ and $g=1$ if $f>0$, $0 \leq h \leq 6$ and $0 \leq z \leq 1$, and B is a fluoroalkyl radical derived from the compound of formula III:

$$R^1-Y-(CH_2)_2Si(R^2)y(OR)_{3-y} \quad (III)$$

wherein $R^1$ is a mono-, oligo- or perfluorinated alkyl group having 1–9 C atoms or a mono-, oligo- or perfluorinated aryl group, Y is a $CH_2$, O or S group, $R_2$ is a linear, branched or cyclic alkyl group having 1–8 C atoms or an aryl group and $0 \leq y \leq 1$, and C is an alkyl radical derived from the compound of formula IV:

$$R^3-Si(CH_3)(OR)_2 \quad (IV)$$

and D is also an alkyl radical derived from the compound of formula V:

$$R^3-Si(OR)_3 \quad (V)$$

wherein $R^3$ in the preceding formulae is in each case identical or different, and is a linear, branched or cyclic alkyl group having 1–8 C atoms, R in the preceding formulae is in each case identical or different, and is a linear, branched or cyclic alkyl group having 1–8 C atoms or an aryl group, and HX is an acid, in which X is an inorganic or organic acid radical, and $0 \leq y \leq 1$, $0 \leq z \leq 1$, $a > 0$, $b > 0$, $c > 0$, $d > 0$, $e > 0$ and $(a+b+c+d) \geq 2$.

7 Claims, No Drawings

FLUOROALKYL-FUNCTIONAL ORGANOPOLYSILOXANE-CONTAINING COMPOSITIONS

BACKGROUND OF THE INVENTION

1. Field of the Invention

The present invention relates to fluoroalkyl functional group containing organopolysiloxane-containing compositions based on water/alcohol, to a process for their preparation and to their use.

2. Description of the Background

Organosilanes of the formula $R'\text{---}Si(R'')_3$, wherein $R'$ is a fluorinated organic radical and $R''$ is a chlorine, methoxy or ethoxy radical, have diverse uses, for example for application of hydrophobically and oleophobically acting layers to surfaces.

It is known that oil- and water-repellent coatings on surfaces, usually glass surfaces, are produced with the aid of fluoroalkylalkoxysilanes and fluoroalkylchlorosilanes. The coatings can be used, for example, to provide plate glass with a dirt-repellent treatment. The processes described are based on sol-gel processes, very fine inorganic particles being produced and employed together with the fluoroalkylsilane. The application of such systems is technically demanding and usually uses complex organic solvent mixtures and additives (European Laid-Open Application No. 0 658 525 and European Laid-Open Application No. 0 629 673).

Large amounts of organic solvents are also employed for the production of oil and water-repellent coatings; for example, an ethanol content of 52% by weight is used in formulations shown in US 5 424 130.

In the processes described, the complicated application processes, on the one hand, and the use of organic solvents, on the other hand, have adverse effects. In some processes, even substances which are very problematic ecologically such as chlorinated hydrocarbons or fluorohydrocarbons, are employed as solvent in a considerable concentration (European Laid-Open Application No. 0 491 251 and European Laid-Open Application No. 0 493 747). A need continues to exist for aqueous based solutions of organosilanes which provide water and oil resistant coatings.

SUMMARY OF THE INVENTION

Accordingly, one object of the present invention is to provide an organosilane system which is soluble in an aqueous system and with which a simultaneously hydrophobic and also oleophobic coating can be produced on substrates in an impregnating process which is easy to conduct.

Another object of the present invention is to provide such systems for a simplified treatment of substrates such as, for example, glass such as glass fibers, fillers and pigments, metals, plastic, textile fibers-including cotton, wood, paper and mineral fibers, and mineral building materials, for example, lime sandstone, concrete, brick or ceramic.

Briefly, these objects and other objects of the present invention as hereinafter will become more readily apparent can be attained by an aqueous alcoholic fluoroalkyl functional group containing organopolysiloxane composition which comprises organopolysiloxanes of the formula I:

$$RO[Si(A)(CH_3)_z(OR)_{1-z}O]_a[Si(B)(R^2)_y(OR)_{1-y}O]_b$$
$$[Si(C)(CH_3)O]_c[Si(D)(OR)O]_d R \cdot (HX)_e \quad \text{(I)}$$

in which A is an aminoalkyl radical derived from the compound of formula II:

$$H_2N(CH_2)_f(NH)_g(CH_2)_h Si(OR)_{3-z}(CH_3)_z \quad \text{(II)}$$

in which $0 \leq f \leq 6$, $9=0$ if $f=0$ and $g=1$ if $f>0$, $0 \leq h \leq 6$ and $0 \leq z \leq 1$, and B is a fluoroalkyl radical derived from the compound of formula III:

$$R^1\text{---}Y\text{---}(CH_2)_2 Si(R^2)_y(OR)_{3-z} \quad \text{(III)}$$

wherein $R^1$ is a mono-, oligo- or perfluorinated alkyl group having 1–9 C atoms or a mono-, oligo- or perfluorinated aryl group, Y is a $CH_2$, O or S group, $R_2$ is a linear, branched or cyclic alkyl group having 1–8 C atoms or an aryl group and $0 \leq y \leq 1$, and C is an alkyl radical derived from the compound of formula IV:

$$R^3\text{---}Si(CH_3)(OR)_2 \quad \text{(IV)}$$

and D is also an alkyl radical derived from the general formula V:

$$R^3\text{---}Si(OR)_3 \quad \text{(V)}$$

wherein $R^3$ in the preceding formulae, in each case is identical or different, is a linear, branched or cyclic alkyl group having 1–8 C atoms, R in the preceding formulae, in each case is identical or different, and is a linear, branched or cyclic alkyl group having 1–8 C atoms or an aryl group and HX is an acid, in which X is an inorganic or organic acid anion such as, for example, chloride, nitrate, formate or acetate, and $0 \leq y \leq 1$, $0 \leq z \leq 1$, $a>0$, $b>0$, $c \geq 0$, $d \geq 0$, $e \geq 0$ and $(a+b+c+d) \geq 2$, preferably $(a+b+c+d) \geq 4$.

DETAILED DESCRIPTION OF THE PREFERRED EMBODIMENTS

Surprisingly, it has been found that cocondensates of aminoalkylalkoxysilanes and fluoroalkylalkoxysilanes form water-soluble compositions by addition of acids, and such solutions are outstandingly suitable for providing substrates with coatings which are simultaneously hydrophobic and oleophobic. Such aqueous alcoholic organopolysiloxane-containing compositions contain Si-bonded fluoroalkyl functional groups are then accessible as homogeneous, clear solutions, which are stable for several weeks. Such compositions are obtained when a mols of water-soluble aminosilanes of formula II, b mols of fluoroalkyl-functional organosilanes of formula III, and c mols and d mols of non-water soluble organosilanes of formulas IV and V, are mixed in 20 a molar ratio of $M=[a/(b+c+d)] \geq 0.1$ where $a>0$, $b>0$, $c \geq 0$, $d \geq 0$, and the organosilane mixture is mixed with water or a water/acid mixture and/or a water/acid/alcohol mixture, the amount of acid suitably being selected such that the reaction mixture has a pH in the range from 1–8. The active compound concentration is suitably adjusted by addition of alcohol or water or an alcohol water mixture after a reaction time of 0.5–24 hours, preferably 1–12 hours, particularly preferably after 2–6 hours. Organosilane polycondensates prepared in this manner have the plausible approximate structure shown in formula I (see above). Complete clarification of the structure by the usual methods of polymer analysis is not possible because of the very high reactivity of the organofunctional siloxanes, and a small proportion of hydroxyl groups instead of the Si bonded alkoxy groups in compounds of formula I, therefore, also cannot be excluded. The content of organopolysiloxanes containing fluoroalkyl groups as the active compound in the composition of the invention is suitably 0.005–85% by weight, preferably 0.01–10% by weight, particularly preferably 0.5–2% by weight. The content of free alcohol, i.e. the proportion of alcohol which the composition comprises as a medium, preferably is 3–50% by weight, particularly preferably more than 5% by weight to 50% by weight.

The composition according to the invention comprises a monobasic inorganic and/or organic acid and/or secondary products thereof, the composition preferably having a pH of 1–8, particularly preferably a pH of 1–6, and especially preferably a pH of 1–5. The term secondary products at this point is to be understood as meaning compounds such as alkali metal halides, in particular sodium chloride or potassium chloride, alkali metal acetates, alkali metal formates, alkali metal nitrates or compounds of the amino groupings in the organopolysiloxanes with inorganic or organic acid radicals such as are within the scope of formula I.

The aqueous alcoholic fluoroalkyl functional group containing organopolysiloxane composition can be prepared by:

mixing water-soluble organosilanes of formula II:

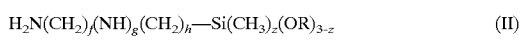

wherein $0 \leq f \leq 6$, $g=0$ if $f=0$ and $g=1$ if $f>1$, $0 \leq h \leq 6$, $0 \leq z \leq 1$ and R is a linear, branched or cyclic alkyl group having 1–8 C atoms or an aryl group, with fluoroalkyl-functional organosilanes of formula III:

wherein $R^1$ is a mono-, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and $0 y \leq 1$, and, if appropriate, organosilanes of formula IV:

and/or organosilanes of formula V:

wherein $R^3$ in the preceding formulas is in each case identical or different, and is a linear, branched or cyclic alkyl group having 1–8 C atoms, R in the preceding formulas is in each case identical or different, and is a linear, branched or cyclic alkyl group having 1–8 C atoms or an aryl group, in a molar ratio of $M=[a/(b+c+d)] \geq 0.1$ where $a>0$, $b>0$, $c>0$, $d>0$, in which a, b, c and d are the sums of the numbers of mols of the organosilanes of formulas II, III, IV and V, respectively;

adding water or a water/acid mixture and/or a water/acid/alcohol mixture to the mixture; and adjusting the pH of the reaction mixture to a value of 1–8.

Another aspect of the invention relates to a process for the preparation of a fluoroalkyl functional group containing organopolysiloxane composition by:

(i) mixing a, b, c and d mols of water-soluble 5 organosilanes of formulas II, III, IV and V, respectively, in a molar ratio of $0.1 \leq [a/(b+c+d)]$, where $a>0$, $b>0$, $c>0$, $d>0$;

(ii) mixing the organosilane mixture with water or a water/acid mixture and/or a water/acid/alcohol mixture, the amount of acid being selected such that the reaction mixture has a pH in the range of 1–8; and (iii) after a reaction time of 0.5–24 hours, adjusting the active compound concentration by addition of alcohol or water or a water/alcohol mixture.

The process of the invention can be, in general, carried out as follows.

The alkoxysilanes of the formulae II and III can first be mixed, and if appropriate alkoxysilanes of formulae IV and/or V can additionally be employed. The mixture can then be subjected to cocondensation with water, and thereafter an acid or an alcohol/acid mixture can be added, the amount of acid suitably being selected such that a pH of 1–8 results in the reaction mixture and the amount of alcohol being selected such that the viscosity of the resulting reaction mixture does not exceed a value of 50,000 mPa·s. Exceeding the viscosity limit in general does not lead to restrictions to the main activity of the organopolysiloxane solutions described, but may result in process technology problems. Products prepared in this way are as a rule water-soluble organopolysiloxane solutions which contain fluoroalkyl groups and are present in concentrated form.

Alternatively, a cocondensate can also be obtained directly by introduction of the alkoxysilane mixture into a water/acid or a water/alcohol/acid mixture and reaction of the components. If it should be necessary subsequently to adjust the pH to a value of 1–8, a monobasic acid is particularly suitable. The compositions of the invention preferably have a pH of 1–8, particularly preferably a pH of 1–6, especially preferably a pH of 1–5. These suitably comprise a monobasic inorganic and/or organic acid and/or secondary products thereof. Secondary products here are understood as meaning compounds such as alkali metal halides, in particular sodium chloride or potassium chloride, alkali metal acetates, alkali metal formates, alkali metal nitrates or compounds of the amino groupings in the organopolysiloxanes with inorganic or organic acid radicals, such as are within the scope of formula I. The compositions of the invention are essentially free from unacceptable organic solvents, but comprise limited amounts of alcohols, in particular methanol and/or ethanol.

The process for the preparation of the present composition of can be carried out as described in detail in the following text. Preferably, in the process of the invention, water-soluble organosilanes of formula II are mixed with water-insoluble organosilanes of formula III and if appropriate with those of formulae IV and/or V. In particular, the following organosilanes are employed:

Suitable organosilanes of the formula II include aminopropyltriethoxysilane, aminopropyltrimethoxysilane, aminopropylmethyldiethoxysilane, aminopropylmethyldiethoxysilane and mixtures thereof.

Suitable fluoroalkyl functional group containing organosilanes of formula III include the compounds which contain $CF_3(CF_2)_7-$, $CF_3(C_6H_4)-$, $C_6F_5-$ or $R^fCH_2CH_2(C=O)-$, where $R^f=C_nF_{2n+1}$, and $n=2-18$, as substituent $R^1$. These fluoroalkyl containing organosilanes are disclosed in German patent Application No. 196 44 561.2. Tridecafluoro-1,1,2,2tetrahydrooctyl-1-trimethoxysilane, tridecafluoro-1,1,2,2tetrahydrooctyl-1-triethoxysilane or the corresponding mixtures thereof are particularly preferred.

Suitable preferred organosilanes of formula IV include dimethyldimethoxysilane, dimethyldimethoxysilane, propylmethyldimethoxysilane, propylmethyldimethoxysilane and mixtures thereof.

Suitable preferred organosilanes of formula V include propyltrimethoxysilane, propyltriethoxysilane, isobutyltrimethoxysilane, isobutyltriethoxysilane, octyltrimethoxysilane, octyltriethoxysilane and mixtures thereof.

The molar ratio of the organosilanes employed satisfies the relationship $0.1 \leq [a/(b+c+d)]$, preferably 0.5 $[a/(b+c+d)] \leq 6000$, particularly preferably $1 \leq [a/(b+c+d)] \leq 3$.

The reaction mixture is then subjected to a cocondensation reaction, preferably with 0.5–30 mols of water per mol of organosilane. An amount of 0.5–20 mols of water is preferably employed, particularly 1-5 mols of water per mol of the silane.

Thereafter, the mixture is treated with an acid or an alcohol/acid or an alcohol/water/acid mixture. Methanol, ethanol, propanol, isopropanol, n-butanol, isobutanol, t-butanol or 2-methoxyethanol is preferably used as the alcohol.

Metering in of ingredients is preferably carried out in portions with periodic interruptions. However, the metering operation can also be carried out continuously with periodic interruptions, or the batchwise and continuous procedure for metering can be combined with one another in a suitable manner.

The pH of the reaction mixture is adjusted to a value of 1–8, preferably to a value of 1–6, particularly preferably to a value of 1–5. An inorganic or organic acid, preferably a monobasic acid, particularly preferably nitric acid or hydrochloric acid or acetic acid or formic acid or mixtures of the abovementioned acids, is employed as the acid component.

The reaction is generally carried out in a temperature range of 0°–100° C., preferably in a temperature range of 10°–80° C., and particularly preferably of 20°–60° C. The reaction medium is normally stirred.

Clouding or precipitation can sometimes occur during or after the reaction. In order to obtain a clear product, the resulting product is suitably after-purified by sedimentation and/or filtration before the desired concentration and pH are established. The filtration and the removal of the sediment can be carried out, for example, via pressure suction filter, a separator, a decanter or similar apparatus.

Products prepared by the present process are stable and as a rule provide clear solutions. The organopolysiloxane-containing composition of the invention can be diluted with water and/or alcohols in any ratio and is essentially free from unacceptable organic solvents and surfactants as emulsifiers.

The present compositions or a composition prepared by the present process are used with significant advantages over known products as described above. Using the present composition, at the same time a hydrophobizing, oleophobizing and dirt- and color-repellent action can be achieved in a simple and outstanding manner on the most diverse substrate surfaces, in particular on glass, for example, plate glass, glass fibers and glass beads, fillers and pigments, metals, plastics, coatings and paints, textile fibers including cotton, wood, paper and mineral fibers, and mineral building materials, for example lime sandstone, concrete, brick or ceramic.

The compositions of the invention can furthermore also be used as release agents, as crosslinking agents, as adhesion promoters, in particular for fluorine polymers, such as, for example,. Teflon or coatings based on fluorine polymers, and as additives for paints and coatings.

The present invention, therefore, also embodies the use of the aqueous alcoholic fluoroalkyl functional group containing organopolysiloxane compositions of the invention for simultaneous hydrophobizing and oleophobizing and for dirt- and color-repellent treatment of surfaces, of metals, of plastics and of mineral building materials, for protecting buildings and facades, for coating glass fibers, for silanizing fillers and pigments, for improving the rheological properties of polymer dispersions and emulsions, for hydrophobizing and oleophobizing and for dirt- and color repellent treatment of textiles, leather and cellulose and starch products and as release agents, as crosslinking agents, as adhesion promoters and as additives for paint and coating formulations.

Having generally described this invention, a further understanding can be obtained by reference to certain specific examples which are provided herein for purposes of illustration only and are not intended to be limiting unless otherwise specified.

Reaction apparatus for all of the following examples including the comparison example Laboratory stirred tank reactor of 2 liter capacity, temperature-controllable, internal temperature measurement, liquid metering device, distillation bridge with overhead temperature measurement, product condenser, distillate receiving container, laboratory pressure suction filter (2 liter capacity).

The products obtained in Examples 1 and 2 of the invention have the following properties in common The product is clear and is miscible with water in any ratio.

Legend to the abbreviations

DYNASYLAN®˜1203, AMEO,=3-aminopropyltriethoxysilane VPS 8161=tridecafluoro-1,1,2,2-tetrahydrooctyl-1trimethoxysilane VPS 8261 =tridecafluoro-1,1.2,2-tetrahydrooctyl-1triethoxysilane

EXAMPLE 1

Preparation of a water-soluble cohydrolyzate from DYNASYLAN® 1203 and VPS 8161 in a molar ratio of 1:1

A 44.2 g amount of DYNASYLAN 1203 and 93.4 g of VPS 8161 are initially introduced into the apparatus described above with a 250 ml stirred reactor. A 14.4 g amount of water are added via the metering device. During this operation, the temperature rises from 20°–30° C. The reaction mixture is stirred at 55°–60° C. for 3 hours. The reaction mixture is then cooled to about 30° C. and 11.9 g of formic acid (85% by weight in water) are added in the course of about 10 minutes. During this operation, the temperature rises to about 40°–50° C.

This concentrate is miscible with water in any ratio.

EXAMPLE 2

Preparation of a water-soluble cohydrolyzate from DYNASYLAN® 1203 and VPS 8261 in a molar ratio of 1:1

A 44.2 g amount of DYNASYLAN 1203 and 102 g of VPS 8261 are initially introduced into the apparatus described above with a 250 ml stirred reactor. A 14.4 g amount of water is added via the metering device. During this operation, the temperature rises from 20°–30° C. The reaction mixture is stirred at 55°–60° C. for 3 hours. The reaction mixture is then cooled to about 30° C. A 11.9 g amount of 10 formic acid (85% by weight in water) is added over the course of about 10 minutes. During this operation, the temperature rises to about 40°–50° C. This concentrate is miscible with water in any ratio. The product is viscous. The viscosity can be reduced significantly by addition of alcohols (methanol or ethanol)

EXAMPLE 3

Treatment of mineral surfaces with the product of Example 1

Brick stone, lime sandstone and concrete stone were cut into ashlars having an edge length of about 5 cm and immersed in the aqueous composition of the invention of Example 1 (diluted with water in a manner such that a 0.5% by weight solution, based on the fluoroalkylalkoxysilane employed, results) for about 5 minutes. After the stones have been dried at room temperature or in a drying cabinet at about 120° C., water and also oil (mineral oil, heating oil -Marlotherm S=tritoluene— or else silicone oil) applied to the surface of the stones no longer penetrates into the surface of the building materials. The beading effect of the liquids mentioned is very good. On untreated specimens, the liquids mentioned penetrate immediately into the surface. The product is, therefore, suitable for simultaneous hydro- and oleophobization of mineral building materials.

EXAMPLE 3a

Treatment of mineral surfaces with the product of Example 1

Brick stone, lime sandstone and concrete stone were cut into ashiars having an edge length of about 5 cm and immersed in the aqueous composition of the invention of Example 1 (diluted with water in a manner such that a 10% by weight solution, based on the fluoroalkylalkoxysilane employed, results) for about 5 minutes. After the stones have been dried at room temperature or in a drying cabinet at about 120° C., water and also oil (mineral oil, heating oil Marlotherm S=tritoluene- or else silicone oil) applied to the surface of the stones no longer penetrates into the surface of the building materials. The beading effect of the liquids mentioned is very good. On untreated specimens, the liquids mentioned penetrate immediately into the surface. The product is, therefore, suitable for simultaneous hydro and oleophobization of mineral building materials.

EXAMPLE 3b

Treatment of mineral surfaces with the product of Example 1

Brick stone, lime sandstone and concrete stone were cut into ashlars having an edge length of about 5 cm and immersed in the aqueous composition of the invention of Example 1 (diluted with water in a manner such that a 0.01% by weight solution, based on the fluoroalkylalkoxysilane employed, results) for about 5 minutes. After the stones have been dried at room temperature or in a drying cabinet at about 120° C., water and also oil (mineral oil, heating oil -Marlotherm S=tritoluene- or else silicone oil) applied to the surface of the stones no longer penetrates into the surface of the building materials. The beading effect of the liquids mentioned is very good. On untreated specimens, the liquids mentioned penetrate immediately into the surface. The product is, therefore, suitable for simultaneous hydro and oleophobization of mineral building materials.

EXAMPLE 3c

Treatment of mineral surfaces with the product of Example 1

Brick stone, lime sandstone and concrete stone were cut into ashlars having an edge length of about 5 cm and immersed in the aqueous composition of the invention of Example 1 (diluted with water in a manner such that a 0.005% by weight solution, based on the fluoroalkylalkoxysilane employed, results) for about 5 minutes. After the stones have been dried at room temperature or in a drying cabinet at about 120° C., water and also oil (mineral oil, heating oil -Marlotherm S=tritoluene- or else silicone oil) applied to the surface of the stones penetrates into the surface of the building materials after a few minutes. Although a beading effect of the liquids mentioned is still present, it is of only short duration. On untreated 10 specimens, the liquids mentioned penetrate immediately into the surface. The product is, therefore, of limited suitability for simultaneous hydro- and oleophobization of mineral building materials.

EXAMPLE 3d (Comparison Example)

Treatment of mineral surfaces with the product of Example 1

Brick stone, lime sandstone and concrete stone were cut into ashlars having an edge length of about 5 cm and immersed in the aqueous composition of the invention of Example 1 (diluted with water in a manner such that a 0.001% by weight solution, based on the fluoroalkylalkoxysilane employed, results) for about 5 minutes. After the stones have been dried at room temperature or in a drying cabinet at about 120° C., water and also oil (mineral oil, heating oil -Marlotherm S=tritoluene- or else silicone oil) applied to the surface of the stones penetrates into the surface of the building materials. A beading effect of the liquids mentioned is no longer observed. On untreated specimens, the liquids mentioned likewise penetrate immediately into the surface. The product is, therefore, not suitable for simultaneous hydra- and oleophobization of mineral building materials.

EXAMPLE 4

Treatment of cotton with the product of Example 1

Cotton was cut into squares having an edge length of about 5 cm and immersed in the aqueous composition of the invention of Example 1 (diluted with water in a manner such that a 0.5% by weight solution, based on the fluoroalkylalkoxysilane employed, results) for about 5 minutes. After the pieces of fabric have been dried at room temperature or in a drying cabinet at about 120° C., water and also oil (mineral oil, heating oil -Marlotherm S=tritoluene- or else silicone oil) applied to the surface of the pieces of fabric no longer penetrates into the surface of the pieces of fabric. The beading effect of the liquids mentioned is very good. On untreated specimens, the liquids mentioned penetrate immediately into the surface. The product is, therefore, suitable for simultaneous hydro- and oleophobization of cotton.

EXAMPLE 5

Treatment of wood with the product of Example 1

A wooden board about 0.5 cm thick was cut into rectangles having an edge length of about 3×5 cm and immersed in the aqueous composition of the invention of Example 1 (diluted with water in a manner such that a 0.5% by weight solution, based on the fluoroalkylalkoxysilane, results) for about 5 minutes. After the pieces of wood had dried at room temperature or in a drying cabinet at about 120° C., water and also oil (mineral oil, heating oil -Marlotherm S=tritoluene- or else silicone oil) applied to the surface of the pieces of wood no longer penetrates into the surface of the pieces of wood. The beading effect of the liquids mentioned is very good. On untreated specimens, the liquids mentioned penetrate immediately into the surface. The product is, therefore, suitable for simultaneous hydro- and oleophobization of wood.

EXAMPLE 6

Treatment of paper with the product of Example 1

Paper handkerchiefs were cut into pieces having an edge length of about 5 cm and immersed in the aqueous composition of the invention of Example 1 (diluted with water in a manner such that a 0.5% by weight solution, based on the fluoroalkylalkoxysilane employed, results) for about 5 minutes. After the pieces of paper have been dried at room temperature or in a drying cabinet at about 120° C., water and also oil (mineral oil, heating oil -Marlotherm S=tritoluene- or else silicone oil) applied to the surface of the pieces of paper no longer penetrates into the surface of the pieces of paper. The beading effect of the liquids mentioned is very good. On untreated specimens, the liquids mentioned penetrate immediately into the surface. The product is, therefore, suitable for simultaneous hydro- and oleophobization of paper.

EXAMPLE 7
Treatment of glass with the product of Example 1

Panes of glass having an edge length of about 10×20 cm were immersed in the aqueous composition of the invention of Example 1 (diluted with water in a manner such that a 0.5% by weight solution, based on the fluoroalkylalkoxysilane employed, results) for about 5 minutes. After the panes of glass have been drained off and dried at room temperature or in a drying cabinet at about 120° C., water and also oil (mineral oil, heating oil -Marlotherm S=tritoluene- or else silicone oil) applied to the surface of the panes of glass beads significantly. The contact angle of the liquids measured is >90°. On untreated specimens, the contact angle is significantly less than 90°. The product leaves behind a film on the pane of glass and is suitable for simultaneous hydro- and oleophobization of glass.

EXAMPLE 8
Treatment of metal surfaces with the product of Example 1

About 1 mm thick, sand-blasted steel sheets and Al foil having an edge length of about 10×20 cm were immersed in the aqueous composition of the invention of Example 1 (diluted with water in a manner such that a 0.5% by weight solution, based on the fluoroalkylalkoxysilane employed, results) for about 5 minutes. After the pieces of steel have been drained off and dried at room temperature or in a drying cabinet at about 120° C., water and also oil (mineral oil, heating oil -Marlotherm S=tritoluene or else silicone oil) applied to the surface of the pieces of steel bead significantly. The product produces a film on the metal surface. The contact angles, evaluated visually, are significantly higher on the treated metal specimens than on the untreated specimens. The product is, therefore, suitable for the simultaneous hydro- and oleophobization of metal surfaces. Storage of coated and non-coated steel sheets in aqueous HCl solution shows a significantly lower corrosion on the steel sheets coated with aqueous fluoroalkylsilane solution of Example 1 (diluted with water to give a 0.5% by weight solution, based on the fluoroalkylalkoxysilane employed).

EXAMPLE 9
Treatment of leather with the product of Example 1

Absorbent leather (chamois) leather was immersed in the aqueous composition of the invention of Example 1 (diluted with water in a manner such that a 0.5% by weight solution, based on the fluoroalkylalkoxysilane employed, results) for about 5 minutes. After the pieces of leather have been dried at room temperature or in a drying cabinet at about 120° C., water and also oil (mineral oil, heating oil -Marlotherm S=tritoluene- or else silicone oil) applied to the surface of the pieces of leather no longer penetrates into the surface of the pieces of leather. The beading effect of the liquids mentioned is very good. On untreated specimens, the liquids mentioned penetrate immediately into the surface. The product is, therefore, suitable for the simultaneous hydro- and oleophobization of leather.

EXAMPLE 10
Treatment of surfaces of plastic with the product of Example 1

Sheets of MMA plastic about 1 mm thick were immersed in the aqueous composition of the invention of Example 1 (diluted with water in a manner such that a 0.5% by weight solution, 30 based on the fluoroalkyl alkoxysilane employed, results) for about 5 minutes. After the sheets of plastic have been drained off and dried at room temperature or in a drying cabinet at about 90° C., water and also oil (mineral oil, heating oil -Marlotherm S=tritoluene- or else silicone oil) applied to the surface of the pieces of plastic beads significantly. The beading effect of the liquids mentioned is very good. On untreated specimens, the contact angle is considerably lower (visual evaluation). The product is, therefore, suitable for the simultaneous hydro- and oleophobization of surfaces of plastic.

The disclosure of German priority Application No. 196 49 955.0 filed Dec. 3, 1996 is hereby incorporated by reference.

Obviously, numerous modifications and variations of the present invention are possible in light of the above teachings. It is, therefore, to be understood that within the scope of the appended claims, the invention may be practiced otherwise than as specifically taught.

What is claimed as new and desired to be secured by Letters Patent of the United States is:

1. An aqueous alcoholic fluoroalkyl functional group containing organopolysiloxane- composition, comprising:

organopolysiloxanes of formula I:

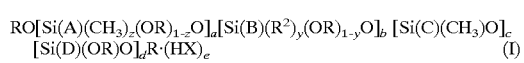

wherein A is an aminoalkyl radical derived from the compound of formula II:

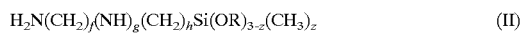

wherein $0 \leq f \leq 6$, $g=0$ if $f=0$ and $g=1$ if $f>0$, $0 \leq h \leq 6$ and $0 \leq z \leq 1$, and B is a fluoroalkyl radical derived from the compound of formula III:

wherein $R^1$ is a mono-, oligo- or perfluorinated alkyl group having 1–9 C atoms or a mono-, oligo- or perfluorinated aryl group, Y is a $CH_2$, O or S group, $R_2$ is a linear, branched or cyclic alkyl group having 1–8 C atoms or an aryl group and $0 \leq y \leq 1$, and C is an alkyl radical derived from the compound of formula IV:

and D is also an alkyl radical derived from the compound of formula V:

wherein $R^3$ in the preceding formulae is in each case identical or different, and is a linear, branched or cyclic alkyl group having 1–8 C atoms, R in the preceding formulae is in each case identical or different, and is a linear, branched or cyclic alkyl group having 1–8 C atoms or an aryl group, and HX is an acid, in which X is an inorganic or organic acid radical, and $0 \leq y \leq 1$, $0 \leq z \leq 1$, $a>0$, $b>0$, $c \geq 0$, $d \geq 0$, $e \geq 0$ and $(a+b+c+d) \geq 2$.

2. The composition as claimed in claim 1, which has a pH of 1–8.

3. The composition as claimed in claim 1, which comprises a monobasic inorganic and/or organic acid and/or secondary product thereof.

4. The composition as claimed in claim 1, wherein the free alcohol content in the composition is 3–50% by weight.

5. The composition as claimed in claim 1, wherein a hydrophobizing and oleophobizing action is achieved upon application of the composition.

6. The composition as claimed in claim 1, wherein the content of fluoroalkyl functional group containing active compounds in the composition is 0.005–85% by weight.

7. A composition as claimed in claim 1, prepared by:

(i) mixing water-soluble organosilanes of formula II:

$$H_2N(CH_2)_f(NH)_g(CH_2)_hSi(OR)_{3-z}(CH3)_z \qquad (II)$$

wherein $0 \leq f \leq 6$, $g=0$ if $f=0$ and $g=1$ if $f>1$, $0 \leq h \leq 6$ and $0 \leq z \leq 1$, and R is a linear, branched or cyclic alkyl group having 1–8 C atoms or an aryl group, with fluoroalkyl radical containing compound of formula III:

$$R^1-Y-(CH_2)_2Si(R^2)y(OR)_{3-y} \qquad (III)$$

wherein $R^1$ is a mono-, oligo- or perfluorinated alkyl group having 1–9 C atoms or a mono-, oligo- or perfluorinated aryl group, Y is a $CH_2$, O or S group, $R^2$ is a linear, branched or cyclic alkyl group having 1–8 C atoms or an aryl group and $0 \leq y \leq 1$, organosilanes of formula IV:

$$R^3-Si(CH_3)(OR)_2 \qquad (IV)$$

and/or organosilanes of formula V:

$$R^3-Si(OR)_3 \qquad (V)$$

wherein $R^3$ in the preceding formulas is in each case identical or different, and is a linear, branched or cyclic alkyl group having 1–8 C atoms, R in the preceding formulae is in each case identical or different, and is a linear, branched or cyclic alkyl group having 1–8 C atoms or an aryl group, in a molar ratio of $M=[a/(b+c+d)] \geq 0.1$ where $a>0$, $b>0$, $c \geq 0$, $d> \geq 0$, in which a, b, c and d are the sums of the numbers of mols of the organosilanes of formulas II, III, IV and V, respectively;

(ii) adding water or a water/acid mixture and/or a water/acid/alcohol mixture to the mixture; and (iii) adjusting the pH of the reaction mixture to a value of 1–8.

* * * * *